United States Patent
Li et al.

(10) Patent No.: US 7,581,244 B2
(45) Date of Patent: Aug. 25, 2009

(54) IMX SESSION CONTROL AND AUTHENTICATION

(75) Inventors: Chia-Hsin Li, San Jose, CA (US); Victor Ivashin, Danville, CA (US); Steve Nelson, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 824 days.

(21) Appl. No.: 11/340,062

(22) Filed: Jan. 25, 2006

(65) Prior Publication Data

US 2007/0180503 A1 Aug. 2, 2007

(51) Int. Cl.
G06F 7/04 (2006.01)
H04L 9/00 (2006.01)

(52) U.S. Cl. .......... 726/5; 726/3; 726/4; 726/6; 726/7; 380/277; 380/278; 380/279; 380/280; 380/281; 713/168; 713/169; 713/170; 713/171

(58) Field of Classification Search .......... 726/5
See application file for complete search history.

(56) References Cited

U.S. PATENT DOCUMENTS

| 5,757,920 | A | 5/1998 | Misra et al. |
|---|---|---|---|
| 5,875,296 | A | 2/1999 | Shi et al. |
| 6,067,623 | A | 5/2000 | Blakley, III et al. |
| 6,233,341 | B1 * | 5/2001 | Riggins .......... 380/277 |
| 6,728,884 | B1 | 4/2004 | Lim |
| 6,775,782 | B1 | 8/2004 | Buros et al. |
| 6,785,810 | B1 | 8/2004 | Lirov et al. |
| 6,823,452 | B1 | 11/2004 | Doyle et al. |
| 2002/0169961 | A1 | 11/2002 | Giles et al. |
| 2003/0023848 | A1 | 1/2003 | Wray |
| 2004/0243805 | A1 | 12/2004 | Enokida |

* cited by examiner

Primary Examiner—Longbit Chai

(57) ABSTRACT

A secured network connection requires three authentication routines. A system access authentication routine requires a client network device to submit user authentication information to a network server. Upon successful user authentication, the network server creates a Client Service Access Pass, embeds this pass into a dynamic web page transmitted to the client device. A client application access authentication routine requires that the dynamic web page pass the Client Service Access Pass to an instantiated client application, which in turn submits it back to a service server on the network server for authentication. Upon success authentication, the network server destroys the Client Service Access Pass, creates a Media File Access Pass, and sends this pass to the client application. A media file access authentication routine requires the client application to submit the Media File Access Pass along with any file access requests to the network server.

24 Claims, 6 Drawing Sheets

IMX SESSION CONTROL AND AUTHENTICATION

BACKGROUND OF THE INVENTION

1. Field of the Invention

The present invention is directed to the field of network access security. Particularly, it is directed towards improving security when providing network access over public networks.

2. Description of the Related Art

Previously, network security was relatively straightforward. One maintained an isolated private network and had full control over who could access the private network and what privileges were granted a client device that logged onto the private network. Security, however, has become much more complicated with the growth of the public Internet, especially when a private intranet, i.e. a private network, is linked to the public Internet.

The worldwide web, hereinafter the web, provides a convenient, inexpensive, and quick means of publishing data. This has proven to be a big allure for companies to provide web access to select databases on their private intranet. However, the extreme ease by which information is disseminated on the web means that it is equally important to ensure that the information is only accessible by those who have the right to access it.

Previously, specialized client software was required to access information on an intranet. Now, anyone with a web browser can view data in an Internet-linked database if it is not properly protected. The number of vulnerable points is further increased if a web server implements dynamic creation of web pages with data from an internal database.

Typically, web security falls under three categories: Server security, i.e. protection of data and/or web pages stored on a server; User-authentication, i.e. prevention of unauthorized access to information (typically through logon security); and Session security, i.e. protection of data as it is transmitted over the Internet.

Server security, i.e. protection of data on a server, takes several forms, depending on the method by which data is distributed. If a server provides only static web pages (i.e. static HTML files previously created from database information and statically stored on the server), basic protection may be obtained by limiting directory browsing. FTP and web servers typically allow directories to be configured such that files stored within them may be read but the files are not shown in a listing of directory contents. Nonetheless, anyone who knows the exact name of a file may still access it directly. Additionally, directories may also be protected using the operating system's integrated system security, such as the use of directory and file attributes.

However, the growing use of dynamic page generation has created additional security risks. Dynamic pages are actively generated by the web server using direct access to a database of information as inquiries for information are received. Typically, a dynamic web page is stored on the server as a template for HTML code and a query. When a client accesses the page, the query is executed and the appropriate information extracted from the database, and an HTML page containing the desired data filled into the template slots is generated. This means that at least a single data source on the web server must be given broad access capabilities to the database.

Furthermore, the tool that generates the dynamic web page may be a server-based middleware or, more commonly, a CGI (i.e. common gate interface) script. The trouble with this is that anyone that can upload an executable script, such as a CGI script, into the server that accesses the single data source may be able to execute a malicious program with complete access to the database. Furthermore, the data source on the server that interfaces with the database might potentially be taken over by another independent program (other than a CGI script), which thereby obtains access to the data. Thus, control over who can gain access to a server is of paramount concern, which leads to the question of user authentication.

User authentication security basically forms the barrier a user must pass before gaining access to particular information or privileges. The most common method of verifying user authentication is by means of a verifying identification sequence, such as a login window. Login operations are typically implemented using an HTML form or using an HTTP security request. An HTML login page is simply an HTML form page that contains username and password fields. The actual identification names and passwords are stored in a table on the server. This information is typically brought to the sever through a CGI script, or other type of database middleware, for lookup in a user identification database. Typically, once a login has occurred, a "cookie" is written onto the client machine to track the user connection session.

A cookie is basically a text file typically stored in a predefined upper level of the directory in which the web browser software is stored. The cookie is assigned a life span, and will remain stored on the client machine until its life span has expired. This life span may have a definite duration, or may elapse when the user session is terminated. Web browsers navigate the Intranet using standard HTTP communication protocols, and thus each message is sent in data packets having a header section followed by a body section. The body section hold the actual data a user intends to be transmitted, whereas the header section holds record keeping information required for the sender and recipient to find each other, organize the received information, recover from errors, etc. That is, the header includes, among other thing, the sender's address, the destination's address, some error recovery code information, sequence information identifying the sequence of the transmitted data packets, and other predefined textual information.

Among this header textual information, web browser software include cookies. If a server responds to a client by transmitting a cookie to the client, the cookie is stored on the client machine. Every time the client web browser contacts a particular web server, the web browser determines if that particular web server has any cookies stored within the client machine, and if it does, then the cookies are included in the header information transmitted to that particular web server. More specifically, a cookie has a name, a value, a domain and a path. Whenever an URL is directed to a cookie's domain to access any file along the cookie's path, the cookie's name and value are passed to the server when the URL is opened.

In essence, every HTTP-based interaction between a client and a server includes a header that contains information about the request (when the communication is from the client to the server) or information about the response (when the communication is from the server to the client). When a server receives a request, the header includes information such as the request type (e.g. GET or POST) and cookies previously stored on the client machine by the server. When the server formulates its response, the header information includes any additional cookies that server want to store on the client computer. When the client's web browser makes a request of a server, cookies previously sent to the client by the server are returned to the server as part of the request formulated by the web browser. For example, web browser Netscape® defines a request header tag called "Cookie" that is used to pass cookie name-value pairs to a server, and a sever can set cookie values in a browser by sending a "Set Cookie" tag in its response header. It may be emphasized that since cookies are part of the HTTP standard, they are transmitted only through HTTP protocols over a defined network socket.

Cookies may be used in non-security related activities, such as on-line shopping to keep track of "shopping cart" contents, previous purchases, previously viewed items, etc. in order to better submit additional items for consideration to the client. However, when used within the field of authentication security, the cookie is typically a textual access code that the client web browser submits to the web server during an open session in order to avoid repeating the user authentication ID/password sequence, and to provide the web browser with a means for monitoring the opened session.

U.S. Patent Application Publication 2002/0169961 implements this type of authentication security. A user client first undergoes a user authenticating sequence, and once authenticated by the web server, the web server requests environmental information from the client machine currently being used by the authorized user. The environmental information is in the form of machine specific information, such as the client machine's hardware configuration. The web server then uses the client machine environmental information as the basis for a hash code to generate an access code for the client machine, which is subsequently sent to the client device as a cookie. As it is known in the art, a hash code is an encoding sequence obtained by applying a mathematical function, i.e. a hashing algorithm, to arbitrary data. Since the access code is tied to the specific client machine, this user authentication sequence prevents multiple people from logging onto the web server simultaneously from different machines. This, of course, raises questions of privacy regarding the capabilities of the user's machine, and U.S. Patent Application Publication 2002/0169961 addresses this issue by suggesting that the client machine's environmental information may be encoded prior to being transmitted to the web server. For additional security, U.S. Patent Application Publication 2002/0169961 suggests that the web server, or other proxy web server, may optionally re-hash the access code cookie using the same environmental information during subsequent web accesses.

Although U.S. Patent Application Publication 2002/0169961 helps to prevent a single ID/password combination from being used for multiple login sessions from multiple machines, it does not prevent multiple login sessions through the same machine. Furthermore, since the access code is stored on the client device as a cookie, the access code is a text file easily located in the cookie's predefined directory within the client machine. It should also be noted that although transmissions on the web may appear to be unidirectional, i.e. from the sender to the receiver, network transmissions are actual broadcasts to all network nodes, and the communication protocol expects that only the named addressee of broadcast data packet will open the transmission. However, any number network snooping software can capture these broadcast transmissions and easily extract the cookie access code.

Since TCP/IP, i.e. the Internet communication protocol, was not designed for security, it is actually quite insecure and additional steps must be taken to assure that web data transmissions are not intercepted or interfered with during a web session connection. This is typically done through encryption of data transmissions, which leads to the subject of session security.

Session security, i.e. preventing data interception as data is broadcast over a network (i.e. the Internet), is typically maintained by use of the secure sockets layer, SSL, protocol, which is typically distinguished from a basic "HTTP" address by the addition of a suffix letter "s", as in "HTTPS". The SSL protocol is supported by agreement among most web browser software companies and uses a handshake when establishing a connection to exchange encryption keys and create an encrypted connection. HTTPS websites use a public/secret key system to encrypt data transmissions between a client and a web server, and thus requires the use of private and public keys generated by a trusted source. For Internet broadcasts, these keys are typically provided for a fee by a few companies, such as VeriSign Inc. Although SSL improves the security of data transmissions, it does not provide for user authentication. Therefore, any person that knows the HTTPS URL of a desired site can still upload and download data files.

What is needed is a network communication system that adds security to Internet network communications without relying on standard HTML protocols, which are publicly well known and hence open to attack. The needed network communication system, however, must still be compatible with standard Internet communication protocols to preserve Internet access.

OBJECTS OF THE INVENTION

It is an object of the present invention to provide a network communication system and method of establishing secured network connections and network transmissions.

It is a further object that the network communication system be compatible with existing Internet communication protocols.

SUMMARY OF THE INVENTION

The present objects are met in a network communication system comprising a network server for selectively providing network access to soliciting clients and a client device for contacting the network server and soliciting network access; wherein the network server is configured to respond to the client device soliciting network access by requesting authentication information from the client device, and responding to receipt of verified authentication information from the client device by generating a first access key code transmitted as a first issued key code within an executable routine to the client device. The executable routine is effective for instigating a client application on the client device and passing the first issued key code to the instigated client application. The client application then transmits, to the network server, the first issue key code as a first returned key code along with a request for establishment of a communication session. The network server responds to the first returned key code matching the first issued key code by destroying the first access key code, establishing a communication session with the client application, establishing a document channel for document communication with the client device, generating a second access key code unrelated to the first access key code, and transmitting the second access key code as a second issued key code to the client application via the document channel.

It is preferred that the network server and the client device communicate over the Internet, and that the executable routine be a dynamic web page. It is further preferred that the client application be independent of any Internet browser application on the client device. For example, the client application may be a self-standing JAVA application. Additionally, the first access key code is preferably unrelated to the client device, and/or the second access key code is unrelated to the first access key code.

In a preferred embodiment, every document submission and document request from the client device to the network server requires the client device to submit, as a current return key code, the issued key code most recently received from the network server. Upon receipt of each document submission and document request from the client device, if the current return access key code submitted by the client device matches the most recently issued key code issued by the network server to the client device, then the network server accepts the submitted document or submitted document request, generates a new access key code, and transmits the newly generated access key code as a current issued key code to the client application.

In the preferred embodiment of the present invention, none of the access key codes generated by the network server is related to each other.

In an alternate embodiment of the present invention, the client device has at least one predefined archive memory space directly accessible by an external memory query to the client device, and each issued key code received by the client application is maintained as an active parameter within volatile memory of the client device, is not located in any predefined archive memory space, and is destroyed upon termination of said client application. More specifically, it is preferred that each issued key code received by the client application be maintained as a temporary register entry within a central controller part of said client device, and not be transferred to any nonvolatile, or archive, memory of the client device.

Preferably, transmissions between the network server and the client device are in the form of transmission packets, and network transmission packets from the client device to the network server include a header section having textual transmission parameter information, and a body section having data provided by the client application, and the returned access key code provided by the client application to the network server is excluded from the header section.

In an alternate embodiment of the present invention, a method of establishing a secure communication link over a computer network between a network server and a client device comprising: establishing a communication session between the network server and the client device, and having the client device submit a document submission request to the network server or submit a document request to the network server; wherein the establishing of the communication session between the network server and the client device includes: having the client device transmit an access request to the network server; having the network server respond to the access request by requesting user authentication information from the client device, and responding to receipt of valid user authentication information from the client device by generating a first access key code and transmitting the first access key code as a first issued key code within an executable routine to the client device; having the client device execute the received executable routine, and having the executable routine instigate a client application on the client device, wherein executable routine passes said first access key code to the client application; having the client application submit to the network server a new request for a communication session and submit the first access key code as a first returned key code; and having the network server respond to the first returned key code matching the first access key code by destroying the first access key code, establishing a communication session with the client application, generating a second access key code, and transmitting the second access key code as a second issued key code to the client application.

In the preferred embodiment of the present invention, the executable routine is an active web page, or dynamic web page. Also, the first access key code is unrelated to the client device. Further preferably, the second access key code is unrelated to the first access key code.

In the preferred embodiment, the network server further responds to the first returned key code matching the first issued key code by establishing a document channel for communication of documents with the client device, and transmitting the second issued key code to the client application via the document channel.

Further in accordance with the present invention, submission of a document from the client device to the network server requires the client device to submit the second issued key code as a second returned access key code along with a request for document submission, and the network server responds to the request for document submission by accepting the document submission if the second returned access key code matches the second access key code, destroying the second access key code, generating a third access key code unrelated to the second access key code, and transmitting the third access key code as a third issued key code to the client application.

In an alternate embodiment in accord with the present invention, submission of a document request from the client device to the network server requires the client device to submit the second issued key code as a second returned access key code along with the document request, and the network server responds to the document request by transmitting the requested document if the second returned access key code matches the second access key code, destroying the second access key code, generating a third access key code, and transmitting the third access key code as a third issued key code to the client application.

Further in accordance with the present invention, every document submission and document request from the client device requires the client device to submit, as a current return key code, the issued key code most recently received from the network server; upon receipt of each document submission and document request from the client device to the network server, if the current return access key code submitted by the client device matches the most recent issued key code issued by the network server to the client device, then the network server accepts the submitted document or submitted document request, generates a new access key code, and transmits the newly generated access key code as a current issued key code to the client application.

Further preferably, the client device has at least one predefined archive memory space directly accessible by an external memory query to the client device; and each issued key code received by the client application is maintained as an active parameter within volatile memory of the client device, is not located in any predefined archive memory space, and is destroyed upon termination of the client application. Specifically, each issued key code received by the client application is preferably maintained as a temporary register entry within a central controller of the client device, and is not transferred to any nonvolatile, or archival, memory of the client device.

Further in accordance with the present invention, the access key code transmitted from the network server to the client device is encoded. Also, transmissions between the network server and the client device are preferably in the form of transmission packets, and network transmission packets from the client device to the network server include a header section having textual transmission parameter information, and a body section having data provided by the client application, and the returned access key code provided by the client application to the network server is excluded from the header section.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention provides multiple layers of protection to a network server, particularly an Internet web server. Firstly, prior to gaining access to the present web server, a client device must first undergo a user login sequence and be authenticated. Even after having been logged in, however, the client device still does not have access to server applications and/or information. A successful login sequence merely establishes a web session with the web server, i.e. the web server establishes an open network connection with the client device. The client device, however, must still undergo further verification when attempting to access web services.

A server in accord with the present invention preferably maintains multiple categories of information, and gaining access to any specific category of information requires that the client device access a corresponding service application on the web server. For example, in the preferred embodiment of the present invention, the web server is a network meeting server providing network (i.e. on-line) meeting access to multiple users. The web server may support multiple meeting applications for various groups of people, or may have a default network application for a default meeting group. Preferably, the web server maintains a separate database of media information, i.e. data and/or media files, for each meeting group. Thus, to gain access to a particular database of media information, one first must join the appropriate meeting group associated with the particular database of media information.

The two main points of security for a web server are access authentication and data encryption. Access Authentication prevents unauthorized users from accessing media files (or other information) on the web server. Encryption of data sent across the Internet helps to avoid compromising data confidentiality. The present invention deals mostly with access authentication, which may be divided into system access via a login page, client application access control to manage access to specific applications on the web server, and media (or other data type) file access control.

Figure 1:
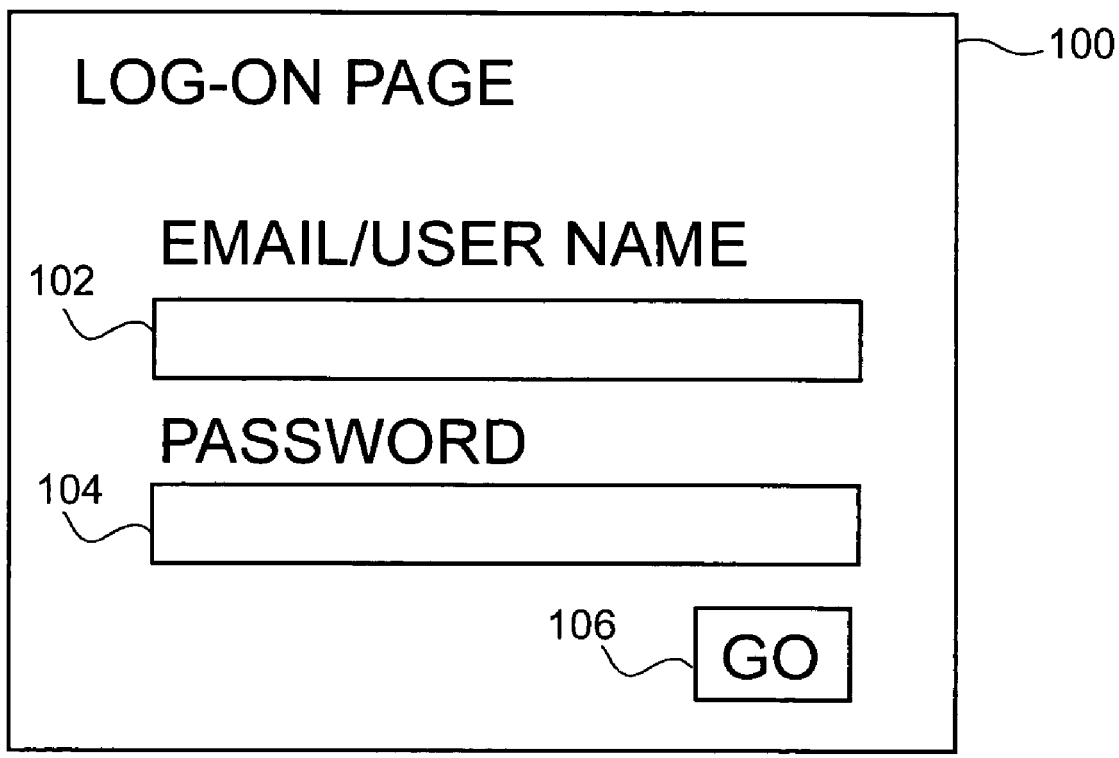
FIG. 1 is a login web page in accord with the present invention.

Regarding system access, client devices wishing to gain access to the present web server should be authenticated before gaining access to any web pages on the web server. Any attempted access to any page other than the login page is preferably redirected to the login page 100, as shown in FIG. 1. All users must preferably enter a valid email address (or user name) 102 and password 104 before gaining system access.

Regarding network client, software application access (herein after, client application access), this access control requires routines to ensure the identity of a client device with every interaction it has with the web server. In the presently preferred embodiment, identification of the client device is obtained by identifying a network client application resident on the client device. That is, preferably each interaction of a client device with the web server subsequent to logging-in requires the use of a client application running on the client device. Furthermore, the client application is preferably required to provide authentication information to verify itself to the server. If no valid client application authentication information is sent to the server, the server may break the connection.

In reference to media file access, it is noted that media files may be accessed via HTTPS protocols for encryption security. However, as is explained above, basic HTTPS protocols do not have user authentication service, and therefore any person who knows the HTTPS URL of a specific site can freely upload and download files, if no additional authentication is required. The present invention seeks to further strengthen media file access security by requiring media file authentication information for each media file access request, i.e. for each upload or download file access request.

Figure 2:
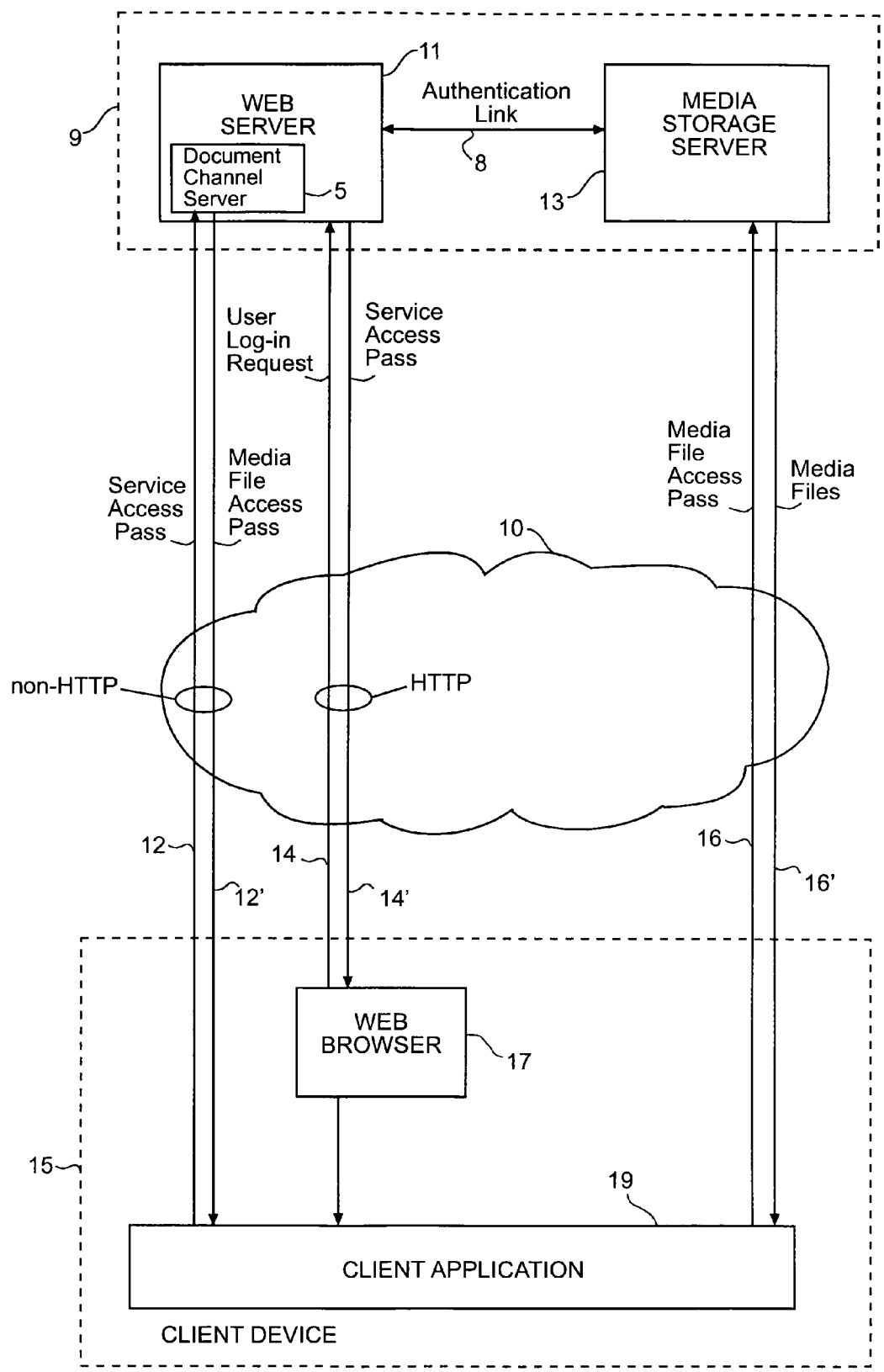
FIG. 2 is a block diagram of network components and data traffic in accord with the present invention.

A general overview of the life cycle of a network services session in accord with the present invention, including system access (i.e. user logon authentication), client application access (i.e. selection and activation of network services), and media file access (i.e. exchange of service files, preferably multimedia files), is best understood with reference to FIG. 2. A network services system in accord with the present invention preferably includes a network server 9 and a user-accessible, network client device 15, both of which preferably have network access to the Internet 10.

In the present embodiment, a user ideally already has a pre-existing user-account registered with network server 9, and utilizes network client device 15 to access network server 9 via the Internet 10. Many methods of establishing such an user-account are known, and the particular method is not critical to the present invention. For example, an individual user may be a member of an organization that provides network access to information on network server 9 via both a secured private network, not shown, and through a public network, such as the Internet 10, which is typically less secure than the private network. In this case, the organization may have created an user-account for the individual user and provided the individual user with user authentication information to be used when the individual user wishes to access secure information (or other network services) on network server 9 through a non-secured network access means, such as through the Internet 10.

Preferably, network server 9 is accessible via the Internet 10, and includes an Internet web server 11 and a media storage server 13. A document channel server 5 is further shown integrated within web server 11. As is explained more fully below, document channel server 5 provides a private Internet channel (i.e. a non-HTTP communication channel) for documenting user-requests for, and granting access to, various network services available on network server 9.

Furthermore, network server 9 is shown in dotted lines to represent multiple network configurations. For example, web server 11 and media storage server 13 may be incorporated into a single, physical network server. Alternatively, web server 11 and document storage server 13 may be separate servers physically distant from each other, and each having independent network access to the Internet 10. In either case, it is preferred that a communication link 8 exist for communication between media storage server 13, web server 11, and document channel 5 to permit sharing of various authentication information, as is more fully explained below. Similarly, although document channel server 5 is shown integrated within web server 11, it may be external to web server 11; in which case a communication link between web server 11, media storage server 13, and document channel server 5 should be maintained.

Network client device 15 is an electronic device capable of executing a web browser module 17 and a network client application module 19. Network client device 15 may be a personal computing device, a personal data assistant device, a cellular telephone, or other multimedia device having network access. It is to be understood, however, that web browser module 17 and client application module 19 may be independent network software applications, each capable of running independently on client device 15 and each using different network communication protocols. For example, it is desirable that web browser 17 provide access to the world wide web (hereinafter, the web), and that it access a web page on web server 11. Therefore, it is to be understood that web browser 17 communicates with web server 11 via the Internet 10 using HTTP, i.e. the Hypertext Transfer Protocol for world wide web communications used by web browsers and web servers.

Document channel server 5, however, is preferably accessed via a non-web link through the Internet 10. Since it is desirable that client application 19 communicate with document channel server 5 through the Internet 10, it is preferable that client application 19 communicate using TCP/IP, or other communications protocol suitable for Internet communications.

In the present example, three line pairs (12/12', 14/14', and 16/16') are shown to represent information transactions to and from network client device 15 and network server 9. This is purely for illustrative purposes to facilitate a discussion of data transactions describe below, but it is to be understood that it suffices to have a single bidirectional communication link between network client device 15 and the Internet 10, and between the Internet 10 and network server 9.

Initially, neither web browser 17 nor client application 19 is instantiated within network client device 15. In the preferred embodiment, a network services session is begun by instantiating web browser 17 within network client device 15, and having network client device 15 use web browser module 17 to contact web sever 11 via link 14 through the Internet 10 using HTTP communication protocols. That is, web browser 17 transmits (14) a request for login access by requesting a login web page provided (14') by web server 11.

Although a secure HTTP protocol (HTTPS) is known, this initial login communication transaction between web sever 11 and web browser module 17 may be implemented using regular (i.e. unsecured) HTTP protocols. The current embodiment does not use HTTPS since it implies an initial level of trust between the server and the client machines. As is explained above, an HTTPS protocol requires that the server and client machines both exchange code keys, but in the present embodiment, it is preferred to avoid granting any level of trust to a would-be user, i.e. client device, until user authentication has been verified.

As shown in FIG. 1, a sample login web page 100 may include a user name or user email field 102 and a password field 104. After filling in the two fields using web browser 17, selecting a submit button 106 causes the entered information to be transmitted (14) to web server 11 for verification.

Returning to FIG. 1, if web server 11 verifies the submitted user authentication information, it will create a web session for client device 15. At this point, various network service options may be listed for selection. For example, the network services may be choices of software applications, such as presentation creation/printing services/data storage services/ data access services/etc.

In the present example, however, it is preferred that network server 9 provides Internet meeting services. In this case, network server 9 may provide a list of meetings, some of which may have previously ended and contain archival information, others of which may be ongoing or other which have not yet begun. In one embodiment, a user of network client device 15 may choose a network service via web browser 17. Alternatively, network server 9 may provide only a predefined one service (such as a predefined one meeting) identified by means of the user's authentication information. In this case, network server may respond automatically to having verified user authentication information without requiring the user to elect one of multiple network services. In either case, once a network service request is identified (either manually or automatically), web server 11 generates a Client Service Access Pass (or specifically in the case of network meeting services, a "Meeting Connection Security Pass"), creates a dynamic web page, and embeds, or integrates, the Client Service Access Pass within the executable code of the dynamic web page.

As is explained above, communications (14/14') between web browser 17 and network server 11 may use unsecured HTTP communication protocols, which leave the communications open to interception by an unscrupulous third party. However, by having the Client Service Access Pass integrated within the executable code of the dynamic web page, the Client Service Access Pass remains secure even if the dynamic web page is intercepted. This particularly true since extraction of the encoded Client Service Access Pass requires the use of client application 19, which is resident on network client device 15. For added security, the Client Service Access Pass may be further encoded using a predefined encoding scheme, preferably using a 128-bit long integer. In this case, the decoding algorithm would be integrated within client application 19.

Web server 11 then transmits (14') the dynamic web page to web browser 17 for activation. As web browser 17 executes the received dynamic web page, the dynamic web page instantiates client application 19, and passes the Client Service Access Pass to client application 19. If desired, a handshake sequence may take place between the dynamic web page and the instantiated client application 19 prior to the Client Service Access Pass being passed to client application 19. For example, each client application 19 resident in every client device 15 serviced by web server 11 may have a unique identifier key word, which is recorded within web server 11. The dynamic web page may interrogate client application 19 for its unique identifier key word for verification prior to passing the Client Service Access Pass to client application 19.

Client application 19 may provide its unique identifier key word in an encoded form to the dynamic web page, which must decode the received identifier information and verify it by comparing it with information provided by web server 11. Alternatively, the dynamic web page may route the received, encoded identifier key word to web server 11 for decoding and verification by web server 11. In this case, the decoding algorithm remains secure within web server 11.

An additional layer of security may be provided by having the dynamic web page apply its own encoding algorithm (using an encoding key that uniquely identifies the dynamic web page) to the received encoded identifier key word prior to routing it to web server 11, which would provide two decoding sequences to extract the identifier key word: the first encoding sequence would uniquely identify the specific dynamic web page sent by web server 11 to web browser 17; and the second encoding sequence would uniquely identify the client application 19.

Once the dynamic web page is ready to pass the Client Service Access Pass to client application 19, it may do so by using ActiveX™ services provided by Internet Explorer™ brand web browsers. Alternatively if ActiveX™ services are not available, since the dynamic web page is running within web browser 17, and since often times web browsers have very limited permissions within a computing device due to network security issues, the dynamic web page may not be able to simply pass the Service Access Pass directly to client application 19, which is running independently of web browser 17.

In this case, the dynamic web page may take advantage of knowledge of the operation of client application 19 to pass it the Service Access Pass without violating security permissions. For example, as it is known in the art, computing devices communicate with a network using one of many available software network ports. In actuality, the network ports are reserved memory addresses in the computing device's available memory space. However, computing standards have reserved some of these ports for network communications services. The dynamic web page may be aware of the specific software network port used by client device 19 to access the network (i.e. the Internet 10), and may transmit the encoded Service Access Pass to this known software network port. Client device 19 would be listening to (i.e. observing) this port, and capture the Client Service Access Pass when it reaches the port. Once the client application device 19 has acquired the Client Service Access Pass, it may decipher and make use of it.

It should be emphasized that since the Client Service Access Pass had been embedded within the dynamic web page, the Client Service Access Pass always remains obscured from web browser 17, and remains obscured from client application 17 until passed to it. This is because the Client Service Access Pass always remains in active memory (i.e. temporary registers within a cpu of client device 15) until it is destroyed by termination of the dynamic web page.

This is unlike network cookies, discussed above. As previously explained, network cookies are text files, or text messages, transmitted within predefined header locations of HTTP transactions packets, and stored within predefined memory locations in network client device 15. These predefined memory locations are typically fully accessible by a user of network client device 15, irrespective of whether the user is authorized or not. For example, the predefined location is typically a predefined, and widely known, directory within the permanent memory storage (i.e. hard drive) of network client device 15. This makes accessing network cookies information by a third party relatively straightforward. In the present case, however, the Client Service Access Pass is embedded within the executable code of the dynamic web page, and is thus not found in the header information of HTTP transaction packets nor stored in any predefined memory location within client device 15. Therefore, when the Client Service Access Pass is passed to the instantiated client application 19, it remains secret and known only to the client application 19, especially if the Client Service Access Pass was encoded by web server 11 prior to being embedded into the dynamic web page.

In the present embodiment, it is therefore assumed that client application 19 is resident within client 15 prior to web server 11 sending the dynamic web page to web browser 17. That is, the dynamic web page launches client application 19, but does not necessarily install it. Client application 19 may have been downloaded and installed previously, or alternatively may have been loaded onto client device 15 when a user account was created for the user. Alternatively, if client application 19 is not already resident within client device 15, the dynamic web page may request and download an installable client application file from network server 9 for installation onto client device 15. Generally, however, it is assumed that client application 19 is provided by network server 9, which can thereby assign an identifier code word to uniquely identify all instantiations of client application 19 loaded onto all client devices 15.

If the user chooses from multiple network service options, then the dynamic web page would also pass information identifying the selected service option to client application 19 in a manner similar to how the dynamic web page passes the Client Service Access Pass to client application 19. However, as was explained above, the presently preferred embodiment assumes that web server 11 automatically selects a predefined service (i.e. a predefined network meeting service) based on the user authentication information. If client application 19 is aware of the one network meeting service corresponding to the user, then it is not necessary for the dynamic web page to pass this service selection information to client application 19. Once the dynamic web page has passed all necessary information to client application 19, it may terminate itself and thereby destroy its embedded security information (i.e. the Client Services Access Pass).

In the presently preferred embodiment, client application 19 will control all further communications with network server 9 to access the desired network service from network server 9. Firstly, however, client application 19 must authenticate itself to network server 9 to prove that it has permission to access the desired network services. This second authentication step is implemented since the initial user authentication service was implemented predominantly through an unsecured HTTP channel (14/14'). This second authentication process is carried out through a non-HTTP link (i.e. preferably though an TCP/IP link) along network channel 12/12'. Since this is link is essentially a restricted link provided by network server 9, several layers of proprietary security measures may be applied to network channel 12/12'. Use of proprietary security techniques eliminates the dangers associated with using publicly available security means, whose weaknesses may be known by many and exploited by some. For example, communications on network channel 12/12' may use a secure private key (or private/public key) where all keys are provided and managed by network server 9, or some other private network associated with network server 9.

This second authentication process (which verifies client application access) begins with client application 19 transmitting the Client Service Access Pass to document channel server 5 along non-HTTP channel 12/12'. Preferably, client application 19 encrypts the Client Service Access Pass prior to submitting it to document channel server 5. Document channel 5 may require communicating with web server 11 in order to properly authenticate the received Client Service Access Pass since web server 11 provided the Client Service Access Pass to client application 19 in the first place. If document channel server 5 successfully authenticates the received Client Service Access Pass, then it will create a unique Media File Access Pass, which may be a 128-bit long integer. However, if document channel server 5 cannot authenticate the received Client Service Access Pass, it may provide client application 19 with the opportunity to re-submit the user authentication information along secure channel 12/12' directly to document channel server 5 for re-authentication. Alternatively, document channel server 5 may route client application 19 back to web server 11 for re-authentication. Preferably, however, document channel 5 will terminate its connection with client application 19 if authentication cannot be verified.

Assuming that document channel server 5 has properly authenticated the Client Service Access Pass transmitted by client application 19, and has consequently generated unique Media File Access Pass, document channel server 5 will transmit the unique Media File Access Pass along secure channel 12/12' to client application 19. It is to be understood that the Media File Access Pass may be encoded prior to being transmitted to client application 19.

Having obtained the Media File Access Pass, client application 19 may now request the required network service from network server 9 along Internet channel, 16/16'. The request for network services to media storage server 13 is accompanied by the Media File Access Pass. It is to be understood that if the network service requested is a network meeting, then media storage server 13 may provide streaming media or multimedia files of the meeting and may receive (for storage) multimedia files of the meeting. That is, every request for, or submission of, a file by client application 19 must be accompanied by a unique Media File Access Pass assigned to client application 19. In this manner, network server 9 may track which specific client application 19 (and thereby which specific client device 15) submitted or downloaded any specific file.

Figure 3:
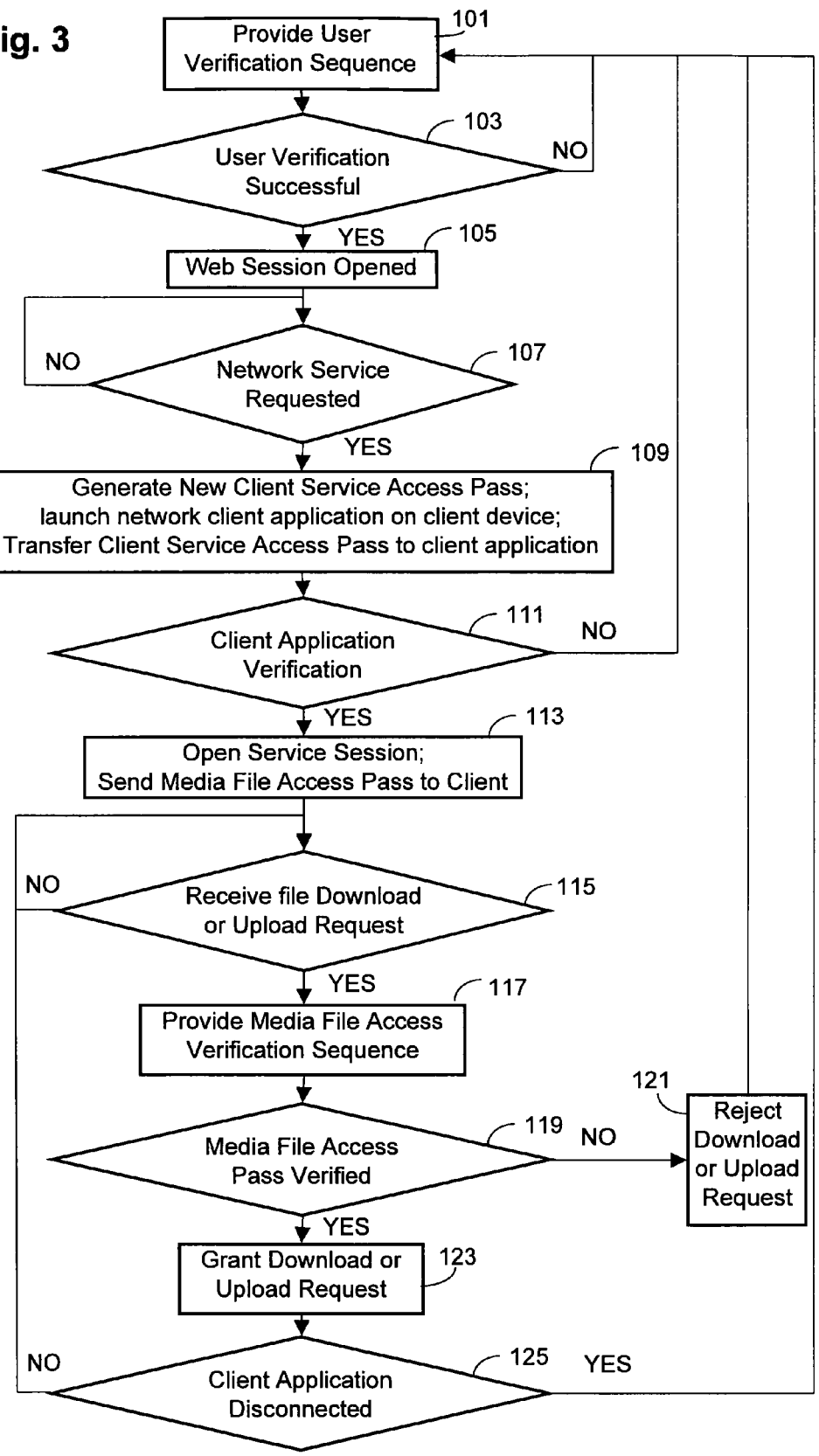
FIG. 3 is a flow chart of a general overview of a network process in accord with the present invention.

If desired, document storage server 13 may destroy each Media File Access Pass it receives from client application 19 with each access request, and have document channel server 5 provide client application 19 with a new Media File Access Pass via secure channel 12/12' to be used on its next access request from client application 19. In this way, if Internet channel 16/16' is an unsecured channel, and a third party manages to see the Media File Access Pass sent by client application 19 to Media Storage Server 13, the system will nonetheless remain secure since Media Storage Server 13 would accept the sent Media File Access Pass only once. That is, even a third party manages to see the Media File Access Pass on its transit from client application 19 to Media Storage Server 13, the third party will not be able to make use of the seen Media File Access Pass since the pass will cease to be a valid pass as soon as it reaches Media Storage Server 13. Upon receipt, Media Storage Server 13 would destroy (i.e. make invalid) the received Media File Access Pass, and document channel server 5 would send a new valid Media File Access Pass to client device 19 via secure channel 12/12' to be used when client device 19 next makes a file access request to Media Storage Server 13. It is preferred a that all Media File Access Passes be provided by document channel server 5 through secure channel 12/12', irrespective of whether Internet channel 16/16' is secured or unsecured. In this way, it is easier to manage the dissemination of valid Media File Access Passes, and the systems channel security measures may be concentrated on one channel, 12/12'. It is further to be understood that the for any given client application 19 (in any given client device 15) its only valid Media File Access Pass would be the most Media File Access Pass recently sent from document channel server 5 to client application 19. Thus, if client application 19 happens to have an unused Media File Access Pass, but it receives a new Media File Access Pass, client application 19 knows to automatically discard the previous Media File Access Pass in favor of the more recently received Media File Access Pass. To recapitulate, an overview of communications between the client device 15 and the network server 9 for permitting client device 15 to access network services on network server 9 is shown in FIG. 3. Client device 15 first initiates a user verification sequence (step 101) by contacting network server 9 and requesting session access by opening a login webpage. Network 9 server will check the submitted user verification information (step 103) to attempt to authenticate the user based on user authentication information submitted in the verification sequence (step 101). If verification is not successful (step 103 return: NO), then no session access is created and the user is directed back to the user verification sequence (step 101) to re-submit user authentication information. If user verification is successful (step 103 returns: YES), however, then a web session is opened for the user (step 105), and the user is provided with a list of available on-line services. When the user requests a service (such as by "clicking" a "Join" option for an network meeting) (step 107 returns: YES), network server 9 will generate a new Client Service Access Pass (i.e. first issued key code) for the client device 15, and actuate a network client application 19 on the client device 15 by means of a dynamic web page (step 109).

On the client device 15, the actuated network client application 19 will communicate with network server 9 to provide client device 15 with the selected network service. Before the actuated, network client application 19 may gain access to the selected network service on network server 9, however, the client application 19 must first verify itself to network server 9 (step 111). This helps to avoid the possibility of a look-alike, third-party network application gaining access to network services on network server 9 by posing as network client application 19. The actuated network client application 19 verifies itself (step 111) by contacting network server 9 via a non-HTTP network channel (i.e. a TCP/IP channel optionally using proprietary encoding schemes) and submitting the Client Service Access Pass previously provided by network server 9 (i.e. first returned key code). If the network client application 19 is not authenticated (step 111 returns: NO), network server closes the communication channel and redirects the client device 15 to the initial login page for user verification (step 101). However, if the network client application 19 is authenticated successfully (step 111 returns: YES), a service session will be opened for client application 19, and a Media File Access Pass (i.e. second access key code) will be sent by secured communications to network client application 19 (step 113). The Media File Access Pass is used whenever the client application 19 wants file access (i.e. upload or download file access) as part of the network service to which it has been granted access.

If network client application 19 does submit a request to download or upload a file to network server 9 (step 115 returns: YES), then network server 9 initiates a file access verification sequence (step 117) to determine whether to grant client application 19 the requested file access. As part of the file access verification sequence, the network client application 19 submits its Media File Access Pass (i.e. current return key code). If the Media File Access Pass cannot be verified (step 119 returns: NO), network server 9 closes the network channel, rejects the upload/download request (step 121) and directs the client device 15 to the login webpage (step 101). Alternatively, if the Media File Access Pass is successfully verified (step 119 returns: YES), then network server 9 will grant the requested upload/download request (step 123).

As long as the client application has not disconnected itself (step 125 returns: NO), the client application 19 may continue to submit upload/download requests, preferably using the same Media File Access Pass to gain file access to network server 9). Alternatively (not shown in FIG. 3), network server 9 may destroy (i.e. invalidate) each validated Media File Access Pass (current return key code) received from client application 19 prior to granting client application 19 its requested file access. In this case, network server 9 would generate a new Media File Access Pass (i.e. new access key code as a current issued key code) and transmit it through a secured communications channel to client application 19. Preferably, the secured communication channel is different from the communication channel on which network server 9 grants the file access request from client application 19. On its next, subsequent file access request, client application must submit the most recently received Media File Access Pass along with its file access request to network server 9.

When client application 19 disconnects itself, i.e. terminates its service session (step 125 returns: YES), network server 9 will close the connection and the user may be provided with the login webpage (step 101).

As seen from the above description, the present communication sequence may be broken down into three sub-sequences: a system access sequence provided by an HTTP login page; client application access sequence that uses a secured, non-HTTP communication link to verify a client application's access right; and a media file access sequence to verify media file access rights. A more detailed breakdown of these three sub-routines follows, below.

Figure 4:
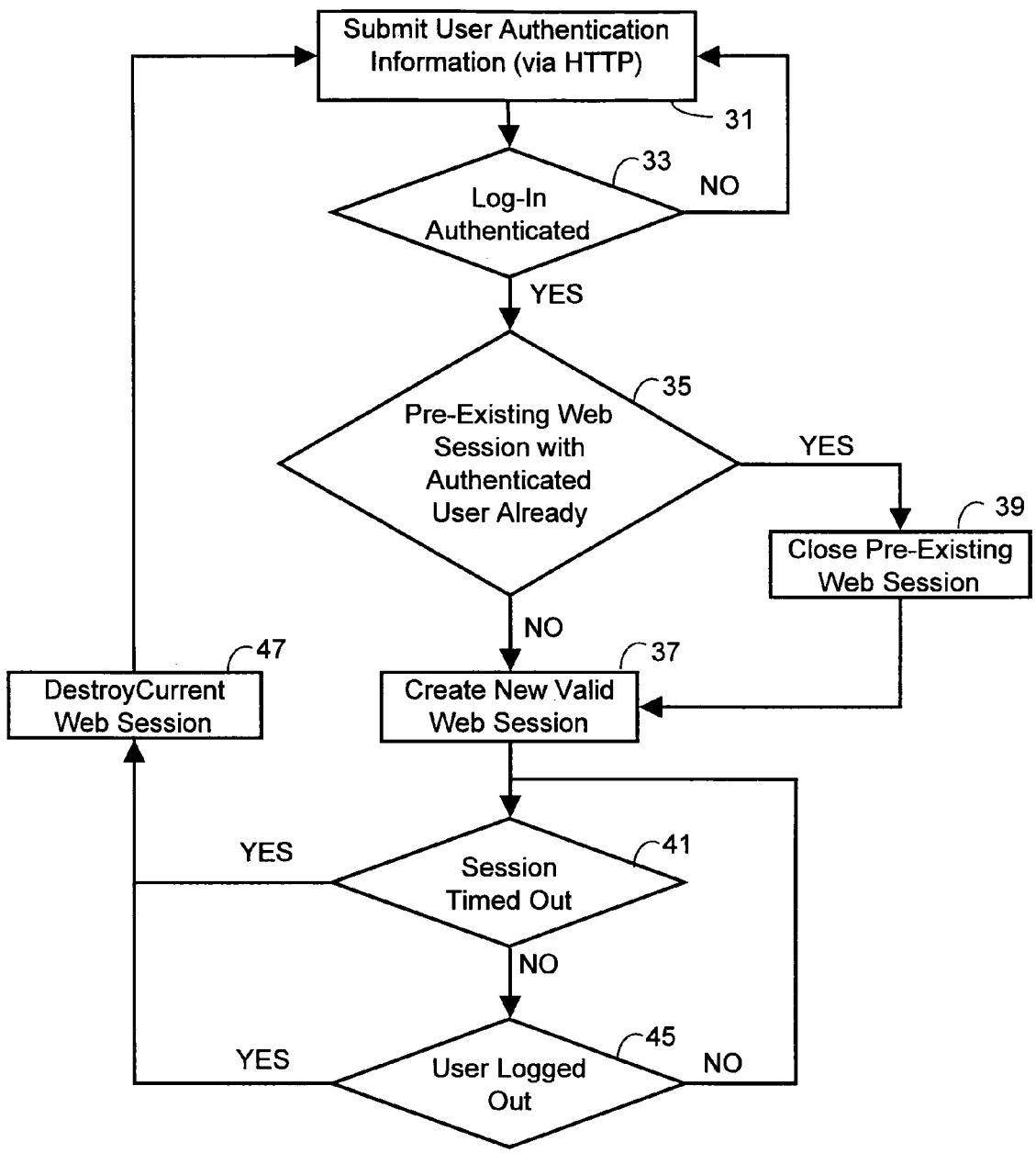
FIG. 4 is a detailed flow chart of a user authentication process in accord with the present invention.

With reference to FIG. 4, the system access sequence begins with the user using web browser 17 to access web server 11 (within network server 9), which responds by sending an HTML login page to web browser 17. The user then enters a user name (or email address) and password as authentication information into the login page and the entered information is sent to web server 11 for authentication (step 31). When web server 11 receives the user authentication information, it will attempt to match the received information with entries in a user database (step 33). If the submitted authentication information matches corresponding information in the user database, a valid web session is created for the user.

As will be made more clear below, the present invention requires submission of authentication information for each access transaction to network server 9, however, the present invention is designed such that personal user authentication information only needs to be submitted once to web server 11 to establish a web session and thereby gain access to various services available on network server 9.

If the submitted user name (or user email account name) and password match an entry in a user authentication information database accessible by (or stored within) web server 13 (step 33 returns: YES), a valid web session may be created (step 37). First however, it is preferred that web server 11 determine if a pre-existing web session for the same authenticated user already exists (step 35). If there is a pre-existing web session (step 35 returns: YES), the earlier web session (i.e. the pre-existing web session) will be destroyed (i.e. closed) (step 39), prior to creating a new valid web session (step 37) for the presently authenticated user. Alternatively, if there is no pre-existing web session (step 35 returns: NO), then the new valid web session is created directly (step 37).

Preferably, a current web session may also be destroyed (step 47) if the web sessions times out (step 41 return: YES), i.e. a predetermined time period elapses without user activity, or if the user purposely logs out (step 45 returns: YES). In this way, a web session is destroyed when the authenticated user logs-out (step 45), the user permits the web session to time out (step 41), or the user logs-in again from another web browser application (step 35), which may indicate that the user has abandoned the previous web session.

Although the user will require a valid web session in order to access any network services on network server 9, it should be noted that no security access pass of any type has yet been sent to the user.

As is explained above, it is preferred that network server 9 provide network meeting services by default, but the user may be permitted to select from several available network services. Thus, a valid web session, as established by web server 11, is required in order to access network meeting web pages, or any other type of network service.

Figure 5:
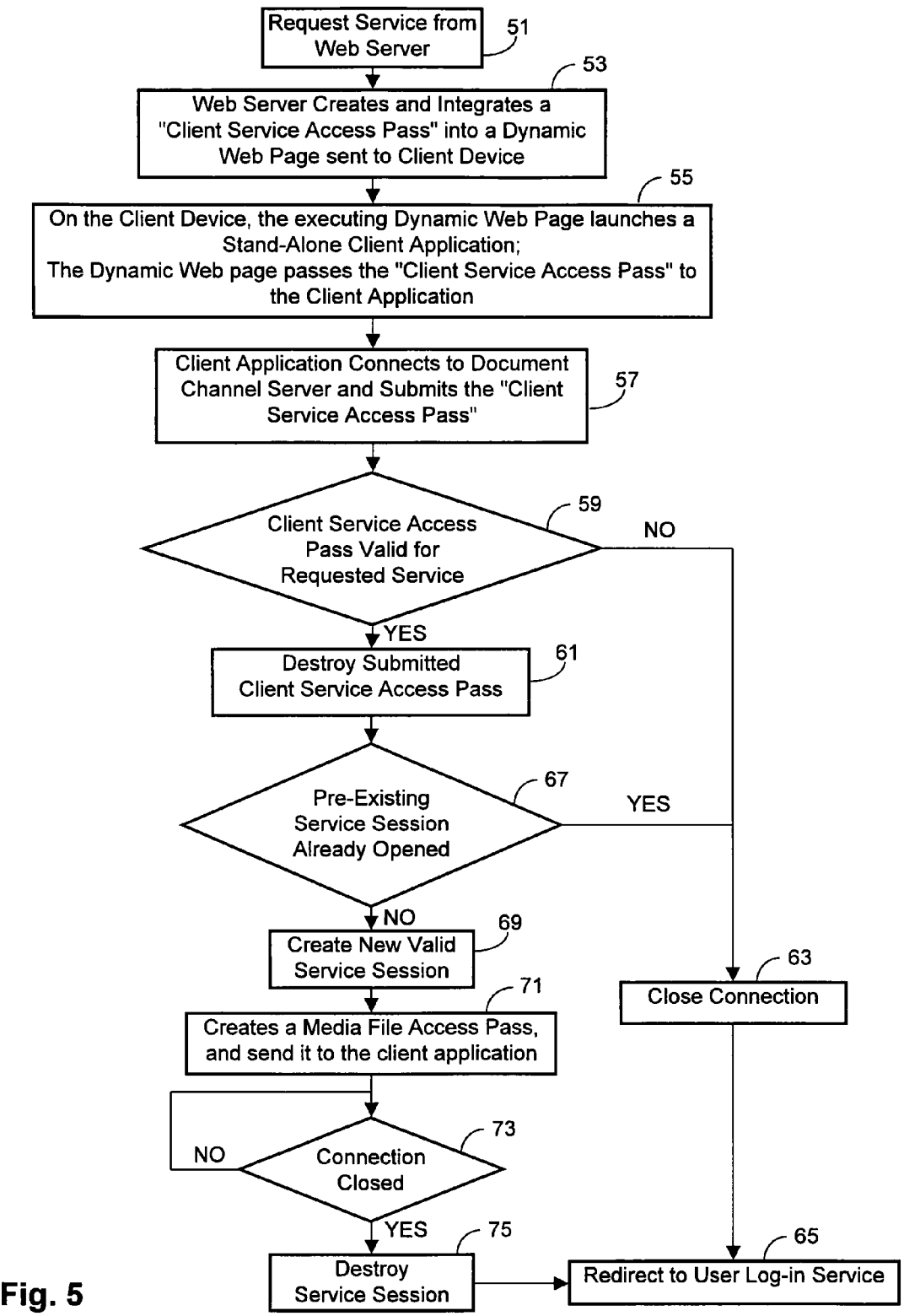
FIG. 5 is a detailed flow chart of a client application authentication process in accord with the present invention.

The client application access sequence is embodied in the life cycle of a document channel session, i.e. the process by which selection and activation of network services are made. With reference to FIG. 5, when the user selects a meeting or selects any other on-line service listed on web server 11 (step 51), web server 11 creates a Client Service Access Pass and integrates it into a dynamic web page (step 53). This service selection may be accomplished by clicking (i.e. selecting) a "JOIN" option provided by web server 11. Preferably, the dynamic web page, when executed, will launch a client application on the client device 15 (step 55). Web server 11 sends the dynamic web page to the client device 53. Upon receiving the dynamic web page, web browser 17 executes the dynamic web page and thereby launches the client application (step 55). It is to be understood that the client application is preferably already resident on the client machine. Otherwise, the dynamic web page may instigate an installation routine for downloading and installing the client application prior to launching it.

Preferably, the client application may only be launched by the dynamic web page. That is, it is preferred that the client device not be allowed to directly launch the client device by any other means than by use of the dynamic web page. In this way, it is assured that the client device 15 cannot activate the client application 19, which is used to access services within network server 9, without first having logged-in to network server 9 and having received a Client Service Access Pass. This may be accomplish by encoding into the executable code of client application 19 an initial start-up routine that confirms the validity of the dynamic web page, and if the validity of the dynamic web page cannot be confirmed, then the client application may terminate itself. Since network server 9 generates a new dynamic web page after receiving a service request from client device 15, network server 9 may assign an identifying client code to each dynamic web page prior to sending it to the client device. The dynamic web page may then pass its identifying client code along with the Client Service Access Pass to the client application, which may use the identifying client code to confirm the validity of the dynamic web page. That is, the identifying client code may be based on a unique number sequence known to he client application, such that the client application can validate the dynamic web page by determining if the supplied client code is obtainable from its known unique number sequence. Alternatively, since client application 19 is provided by, or at least known to, network server 9, it may be given an application identification number by which it may authenticate any dynamic web page sent to client device 15 by network server 9.

When client application 19 is launched, it will pick up the meeting Client Service Access Pass created by network server 9 (step 55).

The launched client application then connects to document channel server 5. Preferably, client application 19 submits the valid meeting Client Service Access Pass, which can be a 128-bit long integer, to the document channel server 5 (step 57). In an alternate embodiment, if the client application 19 can not find the meeting Client Service Access Pass, the client application will prompt the user for the user name and password and send them to web server 11 for re-authentication, or alternatively send them to the document channel server 5, which communicates with web server 11, for authentication. Thus, when client application 19 connects to document channel server 5, client application 19 must send either a valid meeting Client Service Access Pass or user authentication information in order to keep the client connected. If none of the submitted information is valid (step 59 returns: NO), client application 19 will be disconnected from the document channel server 5 (step 63) and redirected to user login services on web server 11 (step 65).

Document channel server 5 will verify the Client Service Access Pass (step 59). If the Client Service Access Pass is valid (step 59 returns: YES), document channel server 5 will keep client application 19 connected. Otherwise (step 59 returns: NO), document channel server 5 will consider client application 19 hostile, close the connection (step 63), and request user login information (step 65).

After the Client Service Access Pass is verified, the submitted Client Service Access Pass is destroyed (step 61). It is then determined if another session created by the same user already opened. If a there is an opened pre-existing session (step 67 returns: YES), then the pre-existing session is maintained, no new connection is created for this later session, and the connection for this later session is closed (step 63). If there is no pre-existing session (step 67 returns: NO), then a new service session is created (step 69).

Document channel server 5 then creates a Media File Access Pass and sends the Media File Access Pass to client application 19 via the document channel 12' (step 71). Since the media file security pass is sent to the client application directly avoiding HTTP protocols, the media file security pass may be encrypted using proprietary encoding schemes to avoid compromising the media file security pass. It is further to be understood that a media file security pass cannot be used in place of a Client Service Access Pass, and thus, a Media File Access Pass cannot be used to re-establish a broken connection. The session remains open (step 73) until the connection is closed by one of various methods, described above. Once the connection is closed (step 73 returns: YES), however, the session is destroyed (step 75) and document channel server 5 redirects any subsequent service access requests to the login service on web server 11 (step 65).

Figure 6:
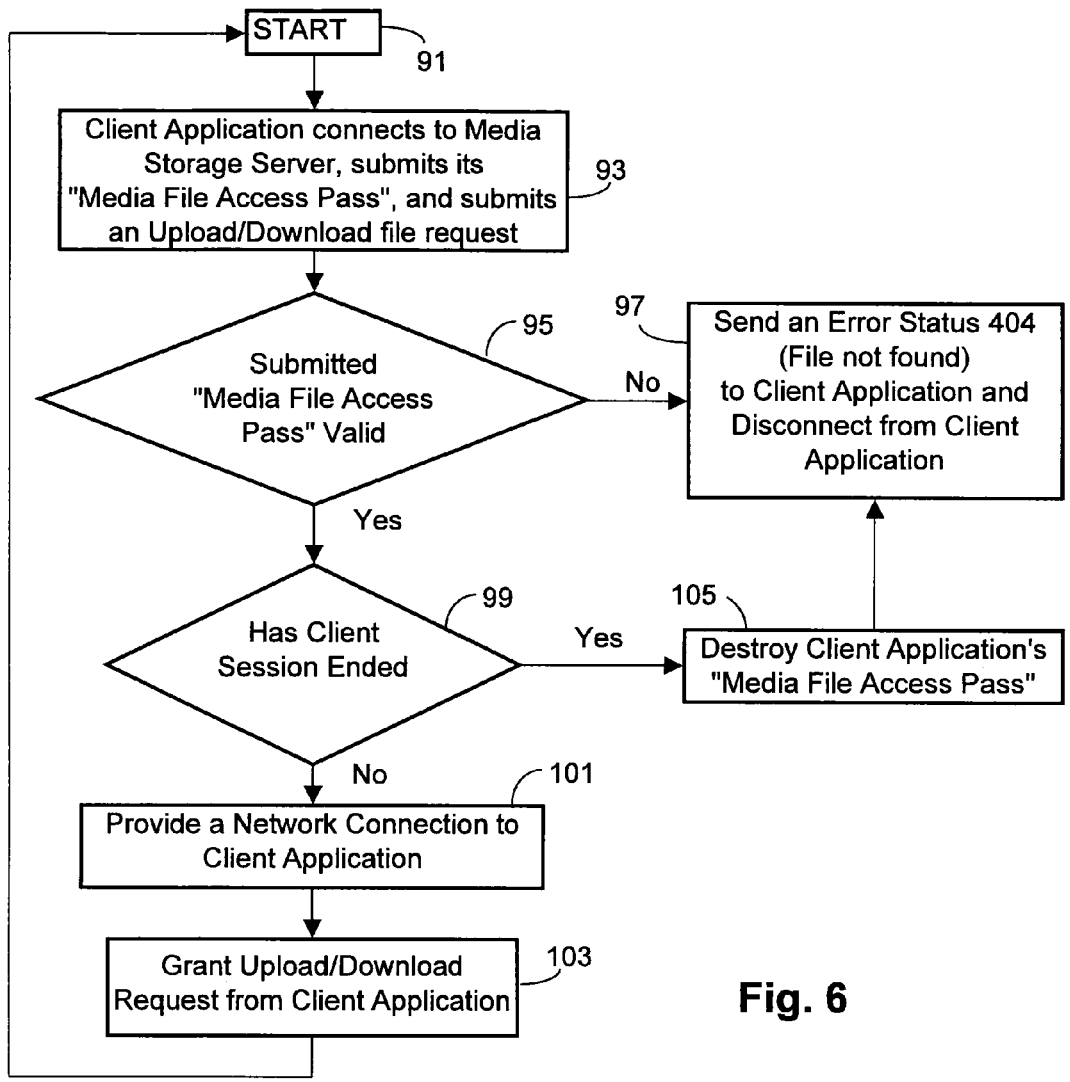
FIG. 6 is a detailed flow chart of a process for verifying file access rights of a client application requesting access of a network server in accord with the present invention.

A more detailed view of the media file access sequence is best understood with reference to FIG. 6. Once client device 15 has received the Media File Access Pass, it may request access to media storage server 13. Firstly, client application 19 submits its Media File Access Pass along with an upload or download file request to media storage server 13 (step 93). That is, when the client tries to upload/download a media file, it will send the Media File Access Pass (which is preferably a 128-bit long integer) as one of its parameters to access the media file.

When the media storage server 13 receives a media file upload/download request, it will verify the Media File Access Pass (step 95). If the Media File Access Pass is not valid (step 95 returns: No), media storage server 13 will send an error code (404) to the client application 19, and preferably also disconnect from client application 19 (step 97).

If the Media File Access Pass is determined to be valid for the selected service (i.e. the specific on-line meeting service), the media storage server 13 will grant a network connection to the client application (step 109) and accept and act upon the upload or download request (step 103).

When the client application 19 disconnects from network server 19 (step 99 returns: YES), the Media File Access Pass will be destroyed from the record of valid access pass codes (step 100) and media storage server 13 will disconnect itself from client application 19 (step 97). In this way, the Media File Access Pass used by client application 19 cannot be used gain.

In one embodiment, client application 19 may use the same Media File Access Pass for multiple file access requests to media storage server 13 until its session is terminated and the media file security pass is destroyed. Alternatively, media storage server 13 may destroy the previous media file security pass with each file access request from client application 19, generate a new media file security pass, and send the new media file security pass to client application 19 to be used in its next file access request.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A network communication system comprising:
   a network server for selectively providing network access to soliciting network clients; and
   a client device for contacting said network server and soliciting network access;
   wherein:
   said network server is configured to respond to said client device soliciting network access by requesting authentication information from said client device, and responding to receipt of verified authentication information from said client device by generating a first access key code transmitted as a first issued key code embedded within an executable software code to said client device;
   said executable software code being effective for launching a client application on said client device and passing said first issued key code to said launched client application;
   said client application being effective for transmitting to said network server said first issue key code as a first returned key code along with a request for establishment of a communication session;
   said network server, upon receipt of a document submission or document request from said client device, responding to said first returned key code matching said first issued key code by destroying said first access key code, accepting the submitted document or document request, establishing a communication session with said client application, generating a second access key code unrelated to said first access key code, and transmitting said second access key code as a second issued key code to said client application.

2. The network communication system of claim 1, wherein said network server and said client device communicate over the Internet, and said executable software code is embodied within a dynamic web page.

3. The network communication system of claim 1, wherein said network server and said client device communicate over the Internet, and said client application is independent of an any Internet browser application on said client device.

4. The network communication system of claim 1, wherein said first access key code is unrelated to said client device.

5. The network communication system of claim 1, wherein:
every document submission and document request from said client device requires said client device to submit, as a current return key code, the issued key code most recently received from said network server;
upon receipt of each document submission and document request from said client device to said network server, if said current return access key code submitted by the client device matches the most recent issued key code issued by said network server to said client device, then said network server accepts the submitted document or document request, generates a new access key code, and transmits the newly generated access key code as a current issued key code to said client application.

6. The network communication system of claim 1, wherein said client application automatically terminates itself if launched by any other means than said executable software code.

7. The network communication system of claim 6, wherein:
said network server assigns said executable software code an identifying ID code;
said client application maintains a predefined launching identification code;
said software executable code passes its identifying ID code to said client application; and
said client application terminates itself is said identifying ID code is not authenticated by said predefined launching identification code.

8. The network communication system of claim 1, wherein:
said client application maintains a predefined client application identification code;
said executable software code passes said first issued key code to said launched client application only if said client application identification code is authenticated by said executable software code.

9. The network communication system of claim 8, wherein:
said network server maintains a store of application ID codes for identifying client applications;
said network application embeds a specific application ID code corresponding to the expected client application within said client device;
and said executable software code uses the embedded specific application ID code to authenticate said client application identification code.

10. The network communication system of claim 8, wherein:
said network server maintains a store of application ID codes for identifying client applications; and
said executable software code transfers said client application identification code to said network server for authentication.

11. The network communication system of claim 1, wherein:
said client device has at least one predefined archive memory space directly accessible by an external memory query to said client device; and
each issued key code received by said client application is maintained as an active parameter within volatile memory of said client device, is not located in any predefined archive memory space, and is destroyed upon termination of said client application.

12. The network communication system of claim 1, wherein each issued key code received by said client application is maintained as a temporary register entry within a central controller part of said client device, and is not transferable to any nonvolatile memory of said client device.

13. The network communication system of claim 1, wherein transmissions between said network server and said client device are in the form of transmission packets, and network transmission packets from said client device to said network server include a header section having textual transmission parameter information, and a body section having data provided by said client application, and the returned access key code provided by said client application to said network server is excluded from said header section.

14. A method of establishing a secure communication link over a computer network between a network server and a client device, said method comprising:
establishing a communication session between said network server and said client device; and
having said client device submit a document to said network server or submit a document request to said network server;
wherein said establishing of said communication session between said network server and said client device includes:
having said client device transmit an access request to said network server;
having said network server respond to said access request by requesting user authentication information from said client device, and responding to receipt of valid user authentication information from said client device by generating a first access key code and transmitting said first access key code as a first issued key code embedded within an executable software code to said client device;
having said client device execute the received executable software code, and having said executable software code launch a client application on said client device, wherein said executable software code passes said first access key code to said client application;
having said client application submit to said network server a new request for a communication session and submit said first access key code as a first returned key code;
having said network server, upon receipt of the document submission or document request from said client device, respond to said first returned key code matching said first access key code by destroying said first access key code, accepting the submitted document or document request, establishing a communication session with said client application, generating a second access key code, and transmitting said second access key code as a second issued key code to said client application.

15. The method of claim 14, wherein said executable software code is embodied within a dynamic web page.

16. The method of claim 14, wherein said first access key code is unrelated to said client device.

17. The method of claim 14, wherein said second access key code is unrelated to said first access key code.

18. The method of claim 14, wherein:
submission of a document from said client device to said network server requires said client device to submit said second issued key code as a second returned access key code along with a request for document submission, and said network server responds to said request for document submission by accepting said document submission if said second returned access key code matches said second access key code, destroying said second access key code, generating a third access key code unrelated to said second access key code, and transmitting said third access key code as a third issued key code to said client application.

19. The method of claim 14, wherein:
submission of a document request from said client device to said network server requires said client device to submit said second issued key code as a second returned access key code along with said document request, and
said network server responds to said document request by transmitting the requested document if said second returned access key code matches said second access key code, destroying said second access key code, generating a third access key code, and transmitting said third access key code as a third issued key code to said client application.

20. The method of claim 14, wherein:
every document submission and document request from said client device requires said client device to submit, as a current return key code, the issued key code most recently received from said network server;
upon receipt of each document submission and document request from said client device to said network server, if said current return access key code submitted by the client device matches the most recent issued key code issued by said network server to said client device, then said network server accepts the submitted document or submitted document request, generates a new access key code, and transmits the newly generated access key code as a current issued key code to said client application.

21. The method of claim 14, wherein:
said client device has at least one predefined archive memory space directly accessible by an external memory query to said client device; and
each issued key code received by said client application is maintained as an active parameter within volatile memory of said client device, is not located in any predefined archive memory space, and is destroyed upon termination of said client application.

22. The method of claim 21, wherein each issued key code received by said client application is maintained as a temporary register entry within a central controller of said client device, and is not transferred to any nonvolatile memory of said client device.

23. The method of claim 14, wherein said access key code transmitted from said network server to said client device is encoded.

24. The method of claim 14, wherein transmissions between said network server and said client device are in the form of transmission packets, and network transmission packets from said client device to said network server include a header section having textual transmission parameter information, and a body section having data provided by said client application, and the returned access key code provided by said client application to said network server is excluded from said header section.

* * * * *